US012240963B2

(12) United States Patent
Guzman-Carrazco et al.

(10) Patent No.: US 12,240,963 B2
(45) Date of Patent: Mar. 4, 2025

(54) PROCESS FOR PREPARATION OF POLYETHYLENE (71) Applicant: SABIC GLOBAL TECHNOLOGIES B.V., Bergen op Zoom (NL)

(72) Inventors: Job Daniel Guzman-Carrazco, Geleen (NL); Maryam Tamaddoni, Geleen (NL); Sanjeev Deshpande, Geleen (NL); Victor Mattheij, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 667 days.

(21) Appl. No.: 17/416,768

(22) PCT Filed: Oct. 14, 2019

(86) PCT No.: PCT/EP2019/077741
§ 371 (c)(1),
(2) Date: Jun. 21, 2021

(87) PCT Pub. No.: WO2020/135939
PCT Pub. Date: Jul. 2, 2020

(65) Prior Publication Data
US 2022/0073714 A1 Mar. 10, 2022

(30) Foreign Application Priority Data
Dec. 27, 2018 (EP) .................................... 18248032

(51) Int. Cl.
*C08F 210/16* (2006.01)
*C08F 2/00* (2006.01)
(Continued)

(52) U.S. Cl.
CPC .......... *C08L 23/0815* (2013.01); *C08F 2/001* (2013.01); *C08F 2/01* (2013.01);
(Continued)

(58) Field of Classification Search
CPC .... C08F 2/001; C08F 2/01; C08F 2/18; C08F 210/16; C08F 6/24; C08F 6/003; C08F 6/10; C08F 6/12; C08F 2500/05
See application file for complete search history.

(56) References Cited

U.S. PATENT DOCUMENTS 6,204,345 B1    3/2001  Berthold et al.
9,587,047 B2 *  3/2017  Batinas-Geurts ..... C08F 110/02
                        (Continued)

FOREIGN PATENT DOCUMENTS

CN         101843984 A        9/2010
WO       2010136202 A1      12/2010
WO    WO 2017/207493 A1 *  12/2017  .............. C08L 23/08

OTHER PUBLICATIONS

International Search Report; International Application No. PCT/EP2019/077741; International Filing Date: Oct. 14, 2019; Date of Mailing: Jan. 24, 2020; 11 pages.
(Continued)

Primary Examiner — Rip A Lee
(74) Attorney, Agent, or Firm — CANTOR COLBURN LLP (57) ABSTRACT The invention relates to a process for the preparation of an ethylene-based polymer, the process comprising: a) suspension polymerizing ethylene and an optional comonomer to obtain a suspension (11) comprising the ethylene-based polymer and wax in a suspension medium comprising a diluent, b) separating the ethylene-based polymer (13) from the suspension (11) to obtain a liquid stream (12) comprising the diluent and the wax, c) feeding at least part of the liquid stream (25) to a forced circulation reboiler (Q) for separating the diluent and the wax to obtain an evaporated stream (27) comprising the diluent, wherein the evaporated stream (27) is recycled to step a).

13 Claims, 2 Drawing Sheets (51) Int. Cl.

| | | |
|---|---|---|
| *C08F 2/01* | (2006.01) | |
| *C08F 2/18* | (2006.01) | |
| *C08F 6/10* | (2006.01) | |
| *C08F 210/02* | (2006.01) | |
| *C08L 23/0807* | (2025.01) | |
| *C08F 6/12* | (2006.01) | |
| *C08F 6/24* | (2006.01) | |

(52) U.S. Cl.
CPC .............. *C08F 2/18* (2013.01); *C08F 210/02* (2013.01); *C08F 210/16* (2013.01); *C08F 6/10* (2013.01); *C08F 6/12* (2013.01); *C08F 6/24* (2013.01); *C08L 2203/18* (2013.01)

(56) References Cited

U.S. PATENT DOCUMENTS

| | | | |
|---|---|---|---|
| 10,696,826 B2* | 6/2020 | Garg | .................... C08F 210/16 |
| 11,597,783 B2* | 3/2023 | Guzman-Carrazco | ....................... C08F 10/06 |
| 2008/0039597 A1 | 2/2008 | Vuorikari et al. | |
| 2012/0004489 A1 | 1/2012 | Mills et al. | |
| 2014/0350200 A1 | 11/2014 | Batinas-Geurts et al. | |
| 2016/0101399 A1 | 4/2016 | McElvain et al. | |
| 2019/0292283 A1 | 9/2019 | Liu et al. | |
| 2019/0339007 A1 | 11/2019 | Prang et al. | |
| 2021/0171749 A1* | 6/2021 | Kumar | ................. C08L 23/0815 |
| 2021/0317290 A1* | 10/2021 | Liu | ....................... C08F 210/16 |
| 2021/0388122 A1* | 12/2021 | Tamaddoni | ............... C08F 2/14 |

OTHER PUBLICATIONS

Written Opinion; International Application No. PCT/EP2019/077741; International Filing Date: Oct. 14, 2019; Date of Mailing: Jan. 24, 2020; 11 pages.

* cited by examiner

Fig. 1

Fig. 2

PROCESS FOR PREPARATION OF POLYETHYLENE

CROSS REFERENCE TO RELATED APPLICATIONS

This application is a National Stage application of PCT/EP2019/077741, filed Oct. 14, 2019, which claims the benefit of European Application No. 18248032.7, filed Dec. 27, 2018. The related applications are incorporated herein in their entirety by reference.

BACKGROUND

The present invention relates to a process for the preparation of an ethylene-based polymer. The present invention further relates to a system for performing such process.

The production of polymer powder by polymerization reactions of monomers in the presence of catalysts is well-known. Commercial use of fluidized bed reactors and suspension polymerization reactors are known.

In a suspension polymerization reactor, the polymerization is conducted in a stirred tank or a continuous loop reactor in which a suspension of polymer particles in a suspension medium comprising a hydrocarbon diluent is circulated. During the course of polymerization, fresh polymer is generated by the catalytic polymerization of monomer, and polymer product is removed from the reactor by removing a portion of the suspension.

In a suspension polymerization process for preparing ethylene-based polymers such as HDPE, wax is an unavoidable byproduct. Wax dissolved in the diluent must be separated from the diluent before the diluent can be fully recycled to the polymerization section. For example, WO2010/136202A1 and U.S. Pat. No. 6,204,345B1 describe such a process.

HDPE resins with significantly high molecular weight (MW) components are required to enhance the mechanical properties of multimodal resins, specifically for the so-called resistant-to crack (RC) grades. The disadvantage of known technologies is that the processes are limited in throughput when producing a multimodal HDPE resin with significantly high molecular weight components.

It is an objective of the present invention to provide a process for the preparation of an ethylene-based polymer with a high throughput, even when the polymer comprises components with high molecular weight components.

BRIEF SUMMARY

The present invention relates to a process for the preparation of an ethylene-based polymer, the process comprising: a) suspension polymerizing ethylene and an optional comonomer to obtain a suspension (11) comprising the ethylene-based polymer and wax in a suspension medium comprising a diluent, b) separating the ethylene-based polymer (13) from the suspension (11) to obtain a liquid stream (12) comprising the diluent and the wax, c) feeding at least part of the liquid stream (25) to a forced circulation reboiler (Q) for separating the diluent and the wax to obtain an evaporated stream (27) comprising the diluent, wherein the evaporated stream (27) is recycled to step a).

BRIEF DESCRIPTION OF THE DRAWINGS

The following is a brief description of the drawings wherein like elements are numbered alike.

DETAILED DESCRIPTION

Accordingly, the present invention provides a process for the preparation of an ethylene-based polymer, the process comprising:
a) suspension polymerizing ethylene and an optional comonomer to obtain a suspension comprising the ethylene-based polymer and wax in a suspension medium comprising a diluent,
b) separating the ethylene-based polymer from the suspension to obtain a liquid stream comprising the diluent and the wax,
c) feeding at least part of the liquid stream to a forced circulation reboiler for separating the diluent and the wax to obtain an evaporated stream comprising the diluent, wherein the evaporated stream is recycled to step a).

The invention is based on the realization that the limitation in throughput is due to the bottleneck during the separation of the diluent from the wax. In known technology (example shown in FIG. 1), diluent is separated from the wax by evaporating the bulk of the diluent in a natural circulation evaporator, known as thermosiphon reboiler, as described in "HDPE Plant Overview and Design of Heat Exchangers", Deepak Pandey, Project Report 2014 http://www.academia.edu/8415158/HDPE_Plant_Overview_and_Design_of_Heat_Exchanger.

Figure 1:
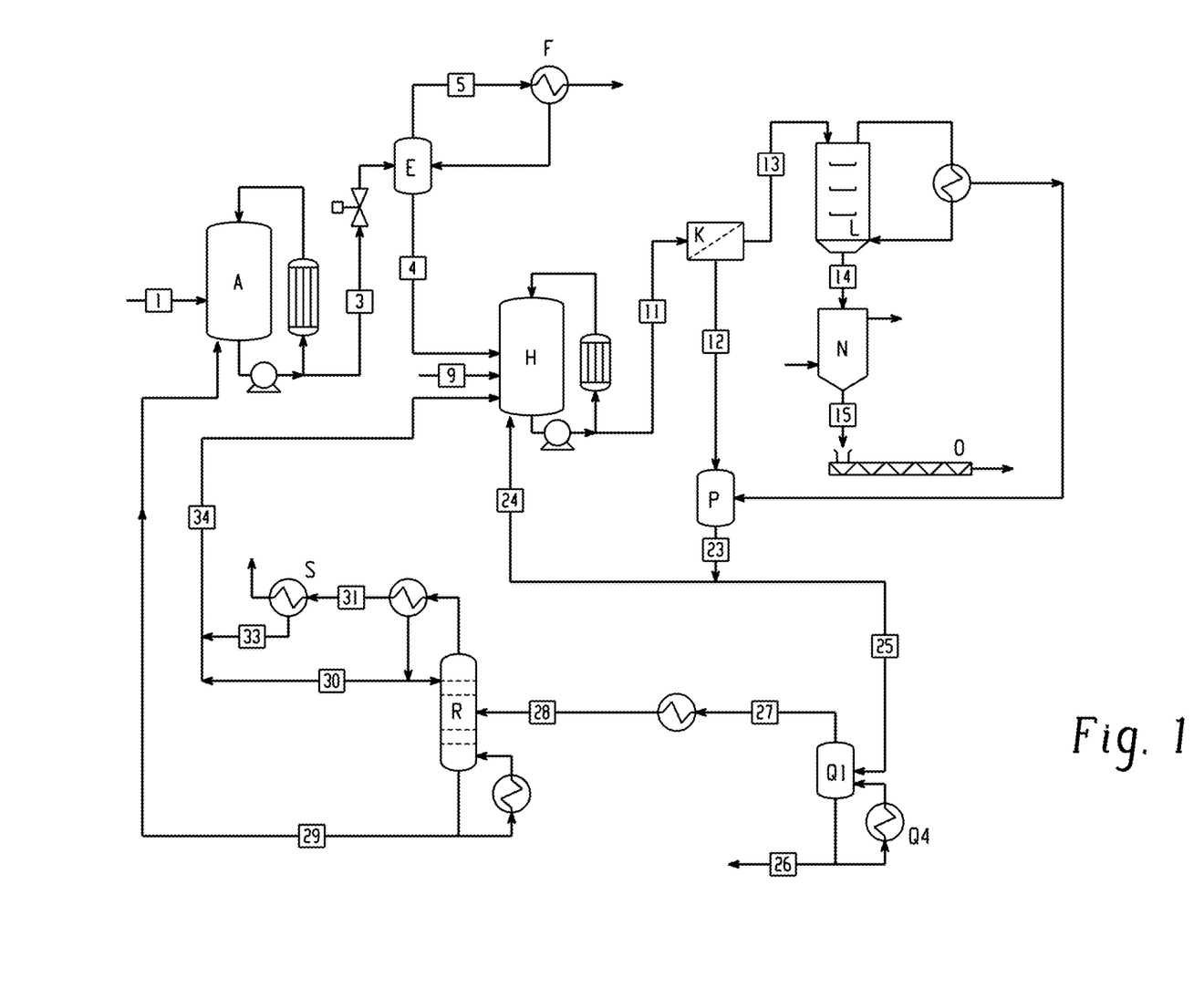
FIG. 1 shows an example of a schematic of a prior process.

Thermosiphon reboilers rely on natural convection to create a fluid flow through a heat exchanger (Q4 in FIG. 1). Natural convection (i.e., flow driven by temperature gradients) can induce sufficient flow when the viscosity of the fluid is relatively low, but flow decreases if the fluid viscosity and the associated resistance to flow increases. A decrease in flow results in a decrease in heat transfer, which typical results in lower temperature gradients further reducing flow.

After analysing slurry samples in several bimodal HDPE production plants, the inventors have discovered that when high MW HDPE components are produced, high MW waxes are also generated. This is by no means obvious. Waxes are the part of the polyethylene resin that is soluble in the diluent at moderate temperatures (30 to 50° C.). The solubility of polyethylene increases when its MW is low or its comonomer content is high. Therefore increasing the MW of the HDPE component cannot, by itself, cause any increase in the MW of the waxes (it could only cause a decrease in the total amount of wax generated because solubility decreases with increasing MW). It is only because the high MW HDPE components of bimodal HDPE resins are rich in comonomer that the MW of the waxes increases. In other words, polyethylene chains that would normally be insoluble, because their MW is too high, become soluble when they contain enough comonomer.

The viscosity of the waxes increases with increasing MW, and when the viscosity of the waxes (and thus the viscosity of the wax-containing mixture) increases, flow through the thermosiphon is reduced. Reduced flow reduces the heat transfer. Reduced heat transfer reduces the maximum amount of diluent that can be evaporated, and the maximum amount of HDPE that can be produced.

The inventors have thus realized that overcoming flow limitations in the evaporator is the key to allow high production throughput during the manufacturing of bimodal HDPE resins with high MW components. Flow limitations can be overcome by the installation of a pump, for example an axial pump, transforming the thermosiphon into a forced circulation rebolier.

Step a)

Step a) involves feeding ethylene, an optional comonomer, optional hydrogen, catalyst components and a diluent to a polymerization reactor to prepare a suspension of solid particles of an ethylene polymer in a suspension medium.

In step a), ethylene and an optional comonomer are polymerized in the presence of a catalyst in a suspension. Particles of ethylene-based polymer are suspended in a suspension medium comprising a diluent. Along with the desired ethylene-based polymer, waxes are formed in the polymerization reactor. The waxes may be dissolved in the diluent or be present in the solid phase together with the solid particles of the ethylene polymer.

Preferably, the polymerization is carried out at a pressure of 0.1 to 20 MPa, preferably 0.1 to 1 MPa and particularly preferably 0.1 to 0.5 MPa.

Preferably, the polymerization is carried out at a temperature of 40° C. to 130° C., more preferably 50 to 110° C., and particularly preferably from 60 to 90° C. The temperature in the polymerization reactor is below the melting point of the polymer in the reactor.

Step b)

Subsequently in step b), the suspension from the reactor is processed to separate the ethylene-based polymer from the suspension. A liquid stream comprising the diluent and the wax is thus obtained.

In some preferred embodiments, step b) involves b1) feeding the suspension to a decanter centrifuge to obtain the liquid stream and a concentrated slurry rich in the solid particles of the ethylene polymer and b2) feeding the concentrated slurry to a dryer such as a fluidized bed dryer to obtain the dry effluent of the solid particles of the ethylene polymer The dry effluent from the fluidized bed dryer may still contain impurities and catalyst residues. The dry effluent may thus be sent to a silo for further degassing and for the neutralization of catalyst residues e.g. by wet nitrogen stripping. Accordingly, the dry effluent of the solid particles of the second ethylene polymer may be subjected to degassing such that the amount of residual diluent in the resulting solid particles of the second ethylene polymer is at most 1000 ppm, preferably at most 500 ppm. The outlet of the silo may be sent to an extruder for pelletization.

Accordingly, step b) preferably further comprises after step b2) the step of b3) feeding the dry effluent of the solid particles exiting the (fluidized bed) dryer to a silo where final degassing with an inert drying gas, and the neutralization of catalyst residues with a polar component takes place.

Step c)

The liquid stream obtained in step b) is processed for separating the wax from the diluent so that the diluent may be recycled to step a).

Before the separation of the wax from the diluent in the forced circulation reboiler, a part of the liquid stream obtained in step b) may be fed to the polymerization reactor.

Thus, at least part of the liquid stream obtained in step b) is fed to a forced circulation reboiler to separate wax from the rest. From the evaporation system, a stream of wax and an evaporated stream comprising the diluent are obtained.

The evaporated stream (27) comprising the diluent may be suitably processed to be recycled to the reactor in step a), as described in more detail below.

Ethylene-based polymer Preferably, the ethylene-based polymer obtained by the process of the present invention is selected from the group consisting of an ethylene homopolymer and an ethylene copolymer of ethylene and C3-C12 α-olefin. Preferably, the ethylene-based polymer is selected from a copolymer of ethylene and 1-hexene, a copolymer of ethylene and 1-butene or a copolymer (terpolymer) of ethylene, 1-hexene and 1-butene. The ethylene-based polymer may be unimodal or multimodal, preferably multimodal.

In the context of the present invention the term "multimodal" shall indicate that the polyolefin comprises at least two fractions of polymers which are obtained under different polymerization conditions. That means the term "multimodal" as used herein shall include also "bimodal". The different polymerization conditions can for example be achieved by using different hydrogen concentrations in different polymerization reactors. The term "copolymer" includes both bipolymers (made of two monomers) and terpolymers (made of three monomers).

Preferably, the amount of ethylene derived units is 60 to 99 wt % and the amount of the comonomer derived units in the copolymer of the invention is 1 to 40 wt %, for example at least 3 to 30 wt %, 5 to 25 wt % or 10 to 20 wt %.

When a copolymer of ethylene, 1-hexene and 1-butene is made, the weight ratio between the 1-hexene derived units and the 1-butene derived units may be 1:99 to 99:1, for example 10:90 to 90:10, for example 50:50.

Catalyst

The polymerization can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)Cl_3$, $Ti(OC_2H_5)Br_3$, $Ti(O-n-C_4H_9)Br_3$, $Ti(OCH_3)2Cl2$, $Ti(OC_2H_5)2Cl2$, $Ti(O-n-C_4H_9)2Cl2$, $Ti(OC_2H_5)2Br2$, $Ti(OCH_3)3Cl$, $Ti(OC_2H_5)3Cl$, $Ti(O-n-C_4H_9)3Cl$, $Ti(OC_2H_5)3Br$, $Ti(OCH_3)4$, $Ti(OC_2H_5)4$ or $Ti(O-n-C_4H_9)4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides, Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides. SiCl4 or CCl4 and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di(C1-C10-alkyl) magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

In preferred embodiments, the catalyst components comprise diethoxymagnesium, $Ti(O-n-C_4H_9)_4$ and ethylaluminum dichloride and a co-catalyst which is tri-iso-butylaluminum or triethylaluminum.

Reactor

The process of the present invention may be carried out in one polymerization reactor. However, more preferably, the process of the present invention is carried out in a series of polymerization reactors comprising at least two polymerization reactors which are connected in series. These reactors are not restricted to any specific design. Preferably, these reactors are loop reactors or stirred tank reactors.

It is possible that the process of the present invention is only carried out in a series of two reactors (the first and the second polymerization reactor). It is however also possible that there are further reactors connected to upstream or downstream of these reactors. Preferably the further reactors are added downstream of the first and the second reactors.

There is no limit to the number of further reactors, but preferably there are not more than two, more preferably only one further reactor added. Thus, in particularly preferred embodiments, the process of the present invention is carried out in a series of three polymerization reactors which are connected in series, which are the first reactor, the second reactor and a further reactor downstream of the second reactor. The further polymerization reactor may be equipped with a hydrogen degassing system.

If there are further polymerization reactors added to the series of the first and the second polymerization reactors, these further polymerization reactors can also be suspension polymerization reactors or can utilize other low-pressure polymerization methods like gas-phase polymerization.

Preferably, the further polymerization reactors are suspension polymerization reactors, in particular of the same type as the suspension reactors used in first and the second reactors.

The further polymerization reactors may also be gas-phase reactors like horizontally or vertically stirred gas-phase reactors, fluidized bed gas-phase reactors or multizone circular reactors, in which two polymerization zones are linked to one another and the polymer is passed alternately a plurality of times through these two zones.

Suspension

The polymerization in the at reactor(s) of the present invention is carried out in suspension in a suspension medium. Hereby a suspension polymerization denotes a polymerization in which the polymerization is carried out in a medium, which is in liquid or in supercritical state under the conditions in the polymerization reactor, and in which the produced polyolefin is insoluble and forms solid particles. The solids content of the suspension is generally in the range of from 10 to 80 wt. %, preferably in the range of from 20 to 40 wt. %.

Hydrogen

Hydrogen is used in the process of the present invention to control the molecular weight of the polyolefin produced in the respective polymerization reactors. In the case of the first and the second reactor in series, the hydrogen concentration in the first polymerization reactor is higher than in the second polymerization reactor. Accordingly, the molecular weight of the polyolefin prepared in the second polymerization reactor is generally higher than in the first polymerization reactor.

Series of Reactors

Preferably, step a) is performed in in a series of polymerization reactors comprising at least a first polymerization reactor and a second polymerization reactor. The suspension subjected to step b) is obtained in the last polymerization reactor of the series, e.g. the second polymerization reactor. Suspension polymerization processes comprising two or more suspension polymerization reactors connected in series have been known for many years. One of the reasons why cascades of two or more polymerization reactors are frequently used is that it is possible to set different reaction conditions in the polymerization reactors and thereby, for example, broaden the molecular weight distribution. Ethylene polymers with a broad molecular weight distribution are commonly used for a multitude of applications because they show advantages in product properties and processability. Such polymers are also often designated as bimodal or more generally as multimodal polyolefin polymers because they are polymerized in a cascade of two or more polymerization reactors under different reaction conditions. The term "multimodal", as used herein and also frequently used in the art, shall include "bimodal".

In such cases of polymerization in a cascade of polymerization reactors, a polymerization catalyst is fed together with monomers to a first reactor, the produced polymer, which still contains active polymerization catalyst, is transferred to a second polymerization reactor, which has different reactor conditions, and the polymerization is continued using the polymerization catalyst still contained in the polymer particle. Normally the different reaction conditions in the different polymerization reactors are set by using different concentrations of hydrogen, which is commonly used as molecular weight regulator.

Accordingly, in some embodiments, the process is performed in a series of polymerization reactors comprising at least a first polymerization reactor and a second polymerization reactor and step a) involves a1) feeding ethylene, hydrogen and catalyst components and a first diluent to the first polymerization reactor to prepare a first suspension of solid particles of a first ethylene polymer in a first suspension medium, a2) feeding the first suspension to a flash drum for vaporizing a part of the first suspension medium to obtain a hydrogen-depleted suspension and a3) feeding the hydrogen-depleted suspension, ethylene and comonomer and a second diluent to the second polymerization reactor to prepare a second suspension of solid particles of a second ethylene polymer in a second suspension medium.

The first diluent and the second diluent may comprise an alkane such as hexane, heptane, octane or nonane. Preferably, each of the first diluent and the second diluent comprises branched heptane. The use of branched heptane as the diluent is optimal for an ethylene copolymerization system where both 1-hexene and 1-butene can be used as the comonomer. In both cases, branched heptane is easy to separate from the final product and the comonomer. Further, the final product has good mechanical properties since it contains low amounts of low molecular weight hydrocarbon reaction products as the result of the use of branched heptane as the diluent.

Preferably, the first diluent is essentially free of comonomer.

Preferably, the second diluent comprises comonomer dissolved in the second diluent.

In the first polymerization reactor, polymerization is performed in a first suspension medium which is essentially free of the comonomer. The first suspension medium comprises hydrogen added to the first reactor. Accordingly, particles of an ethylene homopolymer with a lower molecular weight are obtained in the first polymerization reactor.

The first suspension from the first reactor is then fed to a flash drum to obtain a hydrogen-depleted suspension, which is fed to the second polymerization reactor.

In the second polymerization reactor, polymerization is performed in a second suspension medium. The second suspension medium comprises a second diluent in which comonomer is dissolved. The second suspension medium further comprises comonomer added to the second reactor. Normally, no additional hydrogen is fed to the second reactor and thus the hydrogen level in the second suspension medium is low. Accordingly, an ethylene copolymer with a higher molecular weight is prepared in the second polymerization reactor. The second ethylene polymer is a multimodal copolymer, i.e. a mixture of the first ethylene polymer made in the first reactor (low molecular weight ethylene homopolymer) and the ethylene copolymer made in the second reactor (high molecular weight ethylene copolymer).

Step a1)

In step a1), ethylene, hydrogen, catalyst components and a first diluent are fed to the first polymerization reactor. Ethylene is polymerized. A first suspension of solid particles of a first ethylene polymer in a first suspension medium is formed.

Preferably, the polymerization in the first polymerization reactor is carried out at a pressure of 0.1 to 20 MPa, for example 0.1 to 5 MPa or 0.3 to 1.5 MPa. Particularly preferably, the polymerization in the first polymerization reactor is carried out at a pressure of less than 1.5 MPa.

Preferably, the polymerization in the first polymerization reactor is carried out at a temperature of 40 to 130° C., more preferably 50 to 110° C., and particularly preferably from 60 to 90° C. The temperature in the first polymerization reactor is below the melting point of the polymer in the first reactor.

The first suspension medium which forms the liquid or supercritical phase of the first suspension consists of the first diluent and various components dissolved in the first suspension medium.

The first suspension medium comprises ethylene and residues of catalyst components, dissolved in the first suspension medium. The first suspension medium further comprises hydrogen dissolved in the first suspension medium. During the polymerization, low molecular weight hydrocarbon reaction products are also formed, which may include polyethylene waxes, oligomers, alkanes produced by polymerization (C4, C6, C8, C10, C12, C14 . . . ); alkene isomers (e.g. 2-hexene).

The first diluent is essentially free of the comonomer. Preferably, the amount of the comonomer in the first diluent is at most 0.1 wt % of the first diluent, more preferably the amount of comonomer in the first diluent is at most 0.01 wt % (or 100 ppm) of the first diluent.

The first suspension medium is essentially free of the comonomer. Preferably, the amount of the comonomer in the first suspension medium is at most 0.1 wt % of the first suspension medium, more preferably the amount of comonomer in the first suspension medium is at most 0.01 wt % (or 100 ppm) of the first suspension medium.

Step a2)

The first suspension from the first polymerization reactor is withdrawn and fed to a flash drum. Because of the pressure difference between the first polymerization reactor and the flash drum it is normally not necessary to use a pump for transferring the suspension.

The suspension can be withdrawn directly from the first polymerization reactor. In case of a loop reactor it is also possible to withdraw the suspension from a settling leg.

Furthermore, if the first polymerization reactor is equipped with a cooling circuit, it is preferred to withdraw the suspension from the cooling circuit, preferably after the circulation pump facilitating the transfer to the flash drum. In such a case the withdrawal point may be located after the heat exchanger. Then a suspension of a lower temperature than that in the first polymerization reactor is fed to the flash drum, limiting the amounts of evaporating components of the suspension medium.

More preferably the withdrawal point is located before the heat exchanger. Then the suspension is fed to the flash drum with essentially the same temperature as that of the suspension in the first polymerization reactor and the amount of vaporized material including driven out hydrogen is increased.

A flash drum is generally a vessel which is operated at a lower pressure than that of the first polymerization reactor. Consequently, the suspension medium starts to boil in the flash drum and a part of it is vaporized. In addition to evaporating the diluent also gases dissolved in the suspension medium are driven to the gas-phase. Accordingly, the concentration of hydrogen in the suspension in the flash drum is significantly lower than the concentration of hydrogen in the first suspension in the first polymerization reactor.

The flash drum is generally of a volume that it can be operated partly filled with suspension and the remaining part is occupied by the gas mixture escaping from the suspension. The flash drum can be operated with or without a stirrer. It is further possible to have the flash drum equipped with a jacket for cooling or heating the flash drum in order to influence the temperature within the flash drum. It is further possible to use a series of more than one vessel as combined flash drum for the purpose of the present invention.

Preferably, the pressure in the flash drum is controlled by a vacuum pump connected to the flash drum. The vacuum pump is configured to monitor and adjust the pressure in the flash drum. The vacuum pump may be a root blower.

In some preferred embodiments, the pressure in the flash drum is lower than 0.1 MPa, for example 0.05 to 0.09 MPa. Such low pressure made possible by a vacuum pump allows $H_2$ concentration of below 1 ppm to be attained in the second reactor inlet.

The temperature in the flash drum is normally not controlled, and it is the result of an adiabatic or semi-adiabatic flash at the specified pressure of the vessel. For the typical pressures and diluents under consideration, the temperature of the flash vessel ranges from 40 to 80° C., more typically 60 to 80° C. In general, higher temperatures improve degassing. Higher temperatures can be attained by providing heat, e.g., via the vessel jacket, in a non-adiabatic flash. Temperatures lower than 40° C. are undesired and they may lead to wax deposition and fouling in the transfer line to the second reactor.

In some embodiments, a stripping agent (e.g. nitrogen) is introduced into the flash vessel. This further improves $H_2$ removal. However, the stripping agent must later be recovered in a separate process. Thus, in some embodiments, no stripping agent is introduced into the flash vessel.

A low pressure of the flash drum, such as lower than 0.1 MPa, allows a better removal of hydrogen. A better removal of hydrogen leads to a larger difference in the molecular weights of the polymers produced in the first and the second polymerization reactors.

Preferably, a single flash drum is used instead of a series of flash drums. This is advantageous for cost efficiency.

A heat exchanger may be present between the flash drum and the vacuum pump. In this case, the gas in the flash drum is withdrawn from the flash drum and fed to the heat exchanger, where a part of the gas is condensed. The remaining part, which is not condensed, is preferably fed to the work-up section of the polymerization plant for recovering the components of the suspension medium and in particular directly to the monomer recovery unit.

Any kind of heat exchanger can be used between the flash drum and the vacuum pump. The heat exchanger may be a shell-and-tube heat exchanger. The temperature of the cooling medium, which, for example, can be cooling water or the cooling medium of a chiller, is preferably selected to be in the range of from −20 to 40° C.

In some embodiments, the heat exchanger is a vertical reflux condenser. In this case, the condensed liquid obtained in the heat exchanger flows down by gravity back to the flash vessel. In other embodiments, the heat exchanger is a condenser where the liquid is discharged to a separate tank using a barometric leg or a drain pump.

The liquid obtained in the heat exchanger may be fed to a point in the process where suspension is present, such as the flash vessel, the first polymerization reactor or the second polymerization reactor. Alternatively, the liquid obtained in the heat exchanger may be fed to a point in the process downstream of the second polymerization reactor where no slurry suspension is present Returning the liquid obtained in the heat exchanger to a point in the process where suspension is present can reduce the amount of diluent added to the first or second polymerization reactor from other sources. Returning the liquid obtained in the heat exchanger to a point in the process downstream of the second polymerization reactor where no suspension is present reduces the solvent load in liquid/solid separation units such as the centrifuge and the dryer.

Step a3)

The polymer suspension in the flash drum, which is depleted in hydrogen with respect to the suspension fed to the flash drum, is withdrawn from the flash drum and fed to the second polymerization reactor. This is preferably carried out by means of a transfer pump. Ethylene and comonomer are also fed to the second polymerization reactor. Further, a second diluent is fed to the second polymerization reactor. The monomers are polymerized. A second suspension of solid particles of a second ethylene polymer in a second suspension medium is formed.

Preferably, the polymerization in the second polymerization reactor is carried out at a pressure of 0.1 to 20 MPa, preferably 0.1 to 1 MPa and particularly preferably 0.1 to 0.5 MPa.

Preferably, the polymerization in the second polymerization reactor is carried out at a temperature of 40° C. to 130° C., more preferably 50 to 110° C., and particularly preferably from 60 to 90° C. The temperature in the second polymerization reactor is below the melting point of the polymer in the second reactor.

The second suspension medium which forms the liquid or supercritical phase of the second suspension is formed by the medium of the hydrogen-depleted suspension from the flash drum and the second diluent, as well as various components dissolved in the second suspension medium.

The second suspension medium comprises ethylene, comonomer and residues of catalyst components, dissolved in the second suspension medium. The second suspension medium may comprise hydrogen, but its level is low. Similar to the polymerization in the first reactor, low molecular weight hydrocarbon reaction products are also formed during the polymerization, which may include polyethylene waxes, oligomers, alkanes produced by polymerization (C4, C6, C8, C10, C12, C14 . . . ); alkene isomers (e.g. 2-hexene).

The second diluent further comprises the comonomer dissolved in the second diluent. Preferably, the amount of the comonomer in the second diluent is 1 to 10 wt % of the second diluent. More preferably, the amount of comonomer in the second diluent is 2 to 6 wt % of the second diluent.

Preferably, the amount of the comonomer in the second suspension medium is 1 to 10 wt %, more preferably 2 to 6 wt %, of the second suspension medium.

Step d)

In a system comprising a series of reactors, the process may comprise step d) of processing the evaporated stream obtained in step c) by a distillation column for providing the first diluent and the second diluent.

For example, the gas stream comprising the diluent may subsequently be sent to a distillation column. From the distillation column, 1) a diluent stream essentially free of comonomer, 2) a vapor distillate containing the comonomer and the diluent and 3) a liquid distillate containing the comonomer and the diluent may be obtained.

Preferably, the diluent stream essentially free of comonomer is recycled back to the first reactor as the first diluent.

Preferably, the liquid distillate is recycled back to the second reactor, where it forms at least part of the second diluent.

Preferably, the vapor distillate is cooled to lower temperatures than those used in the distillation column to recover condensable products such as the comonomer, and the obtained condensate from the vapor distillate is fed to the second reactor as part of the second diluent.

Properties

The present invention further relates to the ethylene-based polymer prepared according to the process according to the invention.

Preferably, the ethylene-based polymer has a density of 930 to 970 kg/m$^3$, more preferably the density is between 945 and 960 kg/m$^3$.

Preferably, the ethylene-based polymer has a melt flow index as determined by ISO1133-1:2011 (190° C., 5 kg) ranging between 0.1 to 10 dg/min.

Preferably, the ethylene-based polymer is a multimodal copolymer of ethylene and 1-hexene.

In some preferred embodiments, the ethylene-based polymer is a multimodal copolymer of ethylene and 1-hexene and the copolymer has a strain hardening value of at least 75 MPa measured according to ISO 18488:2015. This copolymer is well suited for the production of conventional and resistant to crack (RC) pipes.

In some preferred embodiments, the ethylene-based polymer is a multimodal copolymer of ethylene and 1-butene and the copolymer has a strain hardening value below 75 MPa according to ISO 18488:2015. The 1-butene copolymers have lower manufacturing costs than 1-hexene counterparts, mostly because of differences in raw material costs. The 1-butene copolymers are well suited for applications other than RC pipes, such as conventional pipe, film, blow molding, and injection molding.

In some embodiments, the copolymer is a terpolymer of 1-butene, 1-hexene, and ethylene. The physical properties and manufacturing costs of these copolymers are in between those of 1-butene and 1-hexene copolymer counterparts. Terpolymers can cover the entire range of applications for multimodal HDPE, and they facilitate the transition between 1-butene and 1-hexene copolymers in HDPE manufacturing plants.

The present invention further relates to the ethylene-based polymer prepared according to the process according to the invention, wherein the ethylene-based polymer is a copolymer of ethylene and 1-butene having a strain hardening value of at least 60 MPa according to ISO 18488:2015. An ethylene/1-butene copolymer with such high strain hardening value was not available in the prior art, since its preparation by a conventional process would produce waxes having an extremely high molecular weight and viscosity, which would be too inefficient to process. In contrast, the invention allows processing of such waxes and thus such a new ethylene polymer is provided according to the invention.

Preferably, such new ethylene polymer is a multimodal copolymer of ethylene and 1-butene. Preferably, the ethylene-based polymer has a density of at least 940 kg/m$^3$, preferably 947 to 951 kg/m$^3$. Preferably, the ethylene-based polymer has a melt flow index of 0.25 to 10 dg/min as determined by ISO1133-1:2011 at 190° C. and a load of 5 kg. Such multimodal HDPE made of ethylene and 1-butene having a high strain hardening can advantageously be used for producing a pipe having a good environmental stress crack resistance (ESCR).

The present invention further relates to an article comprising the multimodal copolymer according to the invention, for example a pipe such as a resistant to crack pipe or a conventional pipe, a film and articles made by blow molding or injection molding.

The present invention further relates to use of the multimodal copolymer according to the invention for making a pipe such as a resistant to crack pipe or a conventional pipe, a film and articles made by blow molding or injection molding.

System

The present invention further provides a system for performing the process according to the invention. The system comprises one or more polymerization reactors and the solvent evaporation system, each adapted for performing the process according to the invention. The system may further comprise other components.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

Figure 2:
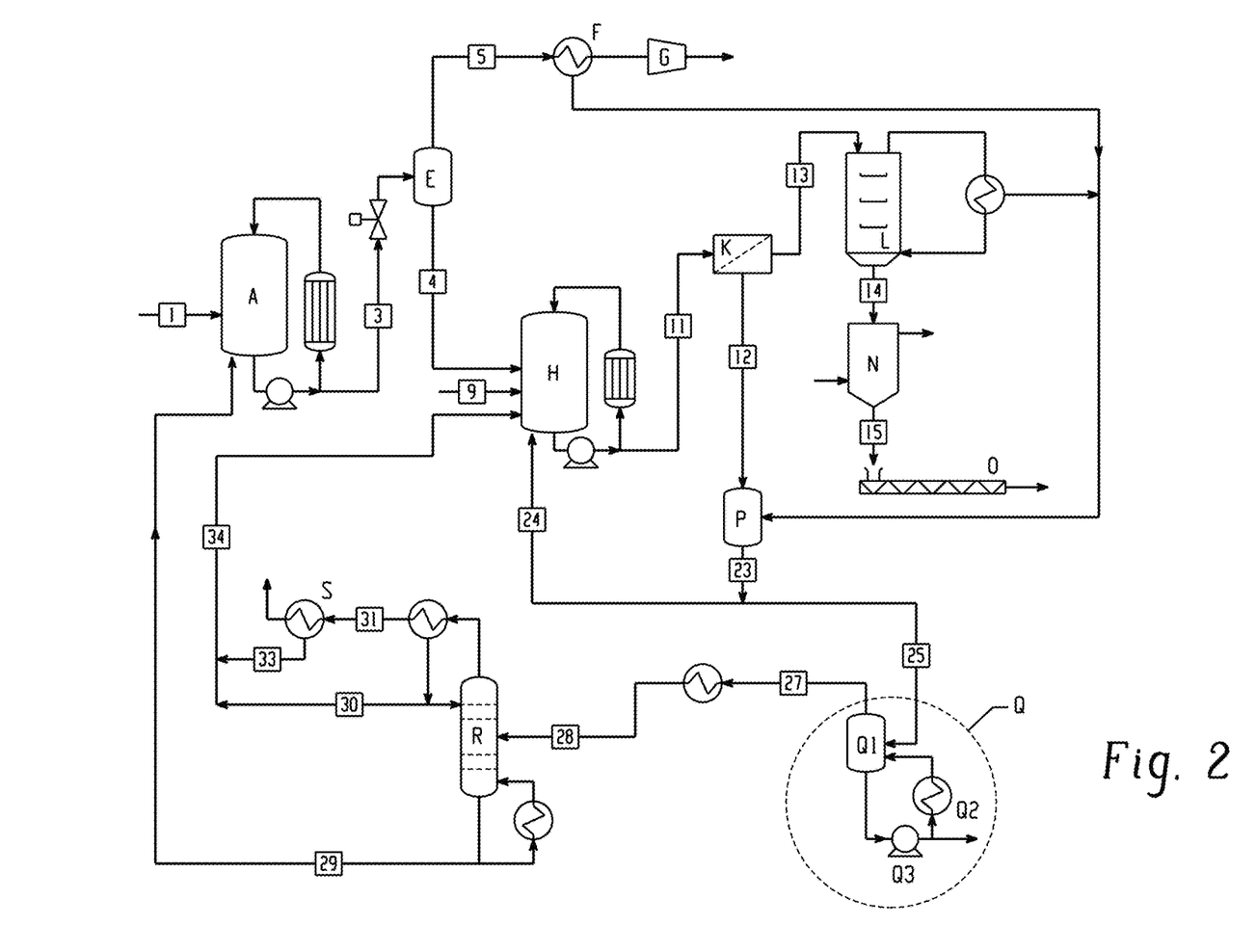
FIG. 2 shows an example of a schematic of the process according to the invention.

The invention is now elucidated with reference to FIG. 2 which schematically illustrates an embodiment of the system of the invention.

FIG. 2 shows an example of a schematic of the process according to the invention.

Reactants (1) ethylene, hydrogen, and catalyst components are fed to a first polymerization reactor (A), along with a first diluent (29). Ethylene polymerization takes place and a first suspension (3) of solid particles of a first ethylene polymer in a first suspension medium is prepared.

The first suspension (3) is withdrawn from the first polymerization reactor (A) and fed to a flash drum (E). A part (5) of the first suspension medium is vaporized to obtain a hydrogen-depleted suspension (4). The pressure in the flash drum (E) is controlled by a vacuum pump (G) connected to the flash drum (E). A heat exchanger (F) is present between the flash drum (E) and the vacuum pump (G). The gas in the flash drum (E) is withdrawn from the flash drum (E) and fed to the heat exchanger (F), where a part of the gas is condensed. The remaining part, which is not condensed, is fed to the work-up section of the polymerization plant for recovering the components of the suspension medium and in particular directly to the monomer recovery unit.

The polymer suspension in the flash drum (E) is withdrawn from the flash drum (E) and fed to the second polymerization reactor (H). Reactants ethylene and comonomer (9) are also fed to the second polymerization reactor (H). Further, a second diluent (24 & 34) is fed to the second polymerization reactor (H). Ethylene copolymerization takes place and a suspension (11) of solid particles of a second ethylene polymer in a second suspension medium is prepared. In the suspension (11), wax dissolved in the diluent is present.

The suspension (11) is withdrawn from the second polymerization reactor (H) and fed to a decanter centrifuge (K). The suspension (11) is separated into an ethylene-based polymer (13) rich in the solid particles of the second ethylene polymer, and a liquid stream (12) rich in the diluent and the comonomer.

The ethylene-based polymer (13) is fed to a fluidized bed dryer (L) to obtain a dry effluent (14) of the solid particles of the second ethylene polymer. The dry effluent (14) is sent to a silo (N) for further degassing and for the neutralization of catalyst residues. The outlet of the silo (15) is sent to an extruder (O) for pelletization.

The liquid stream (12) is combined with other diluent sources into the collecting tank (P). The outlet (23) of the collecting tank (P) is divided and partly fed to the second polymerization reactor (H) to form part of the second diluent (24). The remaining part of the liquid stream (25) is fed to a forced circulation reboiler (Q) in order to separate wax from the diluent. The forced circulation reboiler comprises a vapour/liquid disengagement vessel (Q1), a heat exchanging reboiler (Q2) and a liquid conveying pump (Q3) that ensures flow through the reboiler even when the liquid viscosity is relatively high. The pump (Q3) can be an axial pump, for an example an axial, elbow pump conveying large flows at low discharge heads.

The evaporated stream (27) from the forced circulation reboiler (Q) is fed to a heat exchanger to result in stream (28) and then to a distillation column (R). The distillation column (R) separates the incoming stream (28) into 1) a first diluent (29) essentially free of comonomer, 2) a relatively small vapor distillate stream (31) comprising non condensable gases, along with comonomer and diluent vapors, and 3) a liquid distillate stream (30) containing diluent and comonomer.

The condenser (S) recovers the condensable fraction of the vapor distillate condensate (33). The vapour distillate condensate (33) is mixed with the liquid distillate stream (30), and the diluent mixture is fed to the second polymerization reactor (H) to form part of the second diluent (34). The first diluent (29) is fed to the first polymerization reactor (A) as the first diluent (29). Purification beds (not shown in FIG. 2) are used to remove polar components in first diluent (29), liquid distillate stream (30), and vapor distillate condensate (33) before they enter any of the reactors.

Reference Example 1—State of the Art with PE100

PE100, a type of HDPE resin suitable for pipe applications, was produced in a polymer plant using a slurry CSTR process as described in EP0905152B1. The polymer plant is as shown in FIG. 1, relying on a thermosiphon reboiler to separate waxes from diluent.

The HDPE resin meets the PE100 designation according to ISO 12162, which indicates a minimum required strength of 100 bar. PE100 has at least two polyethelene components of dissimilar molecular weight, where one of the components has a high molecular weight and relatively low density.

Polyethylene wax, collected during the production of the PE 100 resin, was analyzed by Gel Permeation Chromatography (GPC). GPC is a standard method to determine the molecular weight distribution (MWD) and the weight-average molecular weight (Mw) of polymers and oligomers. Wax, collected during the production of the PE 100 resin, was also analyzed in Brookfield viscometer to determine the (undiluted) wax viscosity at 140° C.

In addition, during the production of the PE100 resin, the total HDPE production rate was monitored, and the overall heat-transfer coefficient in the evaporator was calculated.

The heat transfer coefficient was calculated according to the known formula:

$$U = Q/(A \text{ LMTD})$$

where U is the overall heat transfer coefficient, Q is the heat or energy transferred into the process fluid, A is the Area of the exchanger required for heat transfer, and LMTD is the logarithm mean temperature difference between the process fluid and the heating medium (steam in these examples). The quantities Q and LMDT are calculated from process variables, for example, Q is known based on the amount of solvent evaporated and the known heat of evaporation. The actual area of the exchanger is the maximum area available for heat transfer. The required area is the minimum area required to exchange a certain amount of heat/energy. In this document, heat transfer coefficients are calculated based on the required area. The calculation of the overall transfer coefficient is standard and straighforward for a person skill in process engineering.

The table below summarized the results of Reference Example 1: PE100 can be produced at 100% of the nameplate capacity. This is because the viscosity of the associated waxes is low, and the thermosiphon re-boiler works as intended, sustaining a relatively high flow (~503 m3/h) thought the Evaporating exchanger.

| Product type | MW of associated waxes, kg/mol | Viscosity of associated waxes, cP* | Overall heat transfer coefficient in the evaporator, W/(m2 K) | Maximum production rate as percentage of NPC** |
|---|---|---|---|---|
| PE100 | 2.9 | <20 | 161 | 100% |

*Undiluted wax viscosity measurements at 140 C. using a Brookfield CAP2000 + rheometer at 400 rpm
**NPC = name place capacity Additional Information for Reference Example 1

Duty=3113.64 KW

LMTD=41.6 K

Area=463 m² actual, 463 m² required

Recirculating Flow=502 m³/h

Reference Example 2—State of the Art with PE100 RC

Reference Example 1 was repeated using the same process as in Example 1 (FIG. 1), but producing HDPE resin PE100 RC instead of a conventional PE100. PE100 RC is a type of PE100 with the same minimum required strength as standard PE100, but with an increased stress crack resistance.

A key difference between PE100 RC and PE100 is that the molecular weight of the high molecular weight component of PE100 RC needs to be significantly higher than the molecular weight of the high molecular weight component of PE100.

The measured data is summarized below.

| Product type | MW of associated waxes, kg/mol | Viscosity of associated waxes, cP* | Overall heat transfer coefficient in the evaporator, W/(m2 K) | Maximum production rate as percentage of NPC** |
|---|---|---|---|---|
| PE100 RC | 12.1 | 200 to 300 | 94 | 84% |

The key finding is that the maximum attainable production rate is only 84% of the nameplate capacity of the plant. The limitation in production rate is caused by a decrease in the heat transfer coefficient in the Evaporator (from 161 to 94 W/(m2 K), when comparing to Reference Example 1). The limitation in heat transfer is in turn caused by the dramatic increase in the molecular weight and the viscosity of waxes co-produced during the manufacturing of HPDE RC resins.

The increase in wax viscosity decreases the recirculating flow through the exchanger (from 502 to 331 m3/h when comparing to Reference Example 1). The reduced flow decreases the amount of heat transferred, and thus the maximum amount of solvent that can be evaporated to sustain a certain production capacity. This is true, even if the LMTD is increased in an attempt to increase heat transfer.

Additional Information for Reference Example 2

Duty=2930 kW

LMTD=67.1 K

Area=463 m² actual, 462 m³ required

Recirculating Flow=331 m³/h

Example 3—PE100RC According to the Invention

The production of PE 100 RC by the process according to the invention using the polymer plant as shown in FIG. 2 was simulated in Aspen Plus®. As shown in FIG. 2, the process relies on a forced circulation reboiler to separate waxes from diluent.

The Aspen Plus® software has well-established tools to quantify the performance of a known heat exchanger under different conditions. Since the inventors have elucidated that the evaporator heat exchanger is the key bottleneck during the production of RC resins, mathematical modeling of the heat exchanger permits the quantification of the expected RC production rate using this invention.

The findings are summarized in the table below:

| Product type | MW of associated waxes, kg/mol | Viscosity of associated waxes, cP* | Overall heat transfer coefficient in the evaporator, W/(m2 K) | Maximum production rate as percentage of NPC** |
|---|---|---|---|---|
| RC-PE100 | 12.1 | 200 to 300 | 161 | 100% |

*Undiluted wax viscosity measurements at 140 C. using a Brookfield CAP2000 + rheometer at 400 rpm
**Calculated based on known plant constraints A full production rate (100% of nameplate capacity) is achieved when the heat transfer coefficient reaches the level seen in Example 1 (161 W/(m2 K)). The heat transfer coefficient is taken to this level by increasing the flow through the heat exchanger (from 503 to 644 m3/h) via a pump. With this flow, the required heat transfer area is lower than the actual area of the exchanger, indicating that the Exchanger has room for increased heat transfer, beyond what is necessary for full production rate.

Additional Information for Reference Example 3

Duty=3113.06 KW

LMTD=43.3 K

Area=463 m₂ actual, 446 m² required

Recirculating Flow=644 m³/h

The effect of flow on heat transfer is further illustrated in Example 4.

Example 4—PE100RC According to the Invention, with Reduced Pump Flow

The simulation of Example 3 was repeated, using the same process as in Example 3 (FIG. 2), but with a different flow through the exchanger. The flow through the exchanger was set to a higher value than in Reference Examples 1 and 2, but lower than in Example 3. Since the flow through the exchanger is lower than in Example 3, the heat transfer coefficient in Example 4 is lower than in Example 3 and Example 1. Nevertheless, full HDPE production (100% NPC) can still be attained by a slight increase in the LMTD over the LMTD of Example 1, and by full utilization of the heat exchanger (making the required transfer area equal to actual area).

The results of Example 4 are summarized in the Table below. Examples 3 and 4 illustrate the flexibility in process operation that control over the re-circulation flow brings.

| Product type | MW of associated waxes, kg/mol | Viscosity of associated waxes, cP* | Overall heat transfer coefficient in the evaporator, W/(m2 K) | Maximum production rate as percentage of NPC** |
|---|---|---|---|---|
| RC-PE100 | 12.1 | 200 to 300 | 156.1 | 100% |

*Undiluted wax viscosity measurements at 140 C. using a Brookfield CAP2000 + rheometer at 400 rpm
**Calculated based on known plant constraints Additional Information for Example 4

Duty=3113.06 KW
LMTD=43.0 K
Area=463 m² actual, 463 m² required
Recirculating Flow=619 m³/h

The invention claimed is:

1. A process for the preparation of an ethylene-based polymer, the process comprising:
  a) suspension polymerizing ethylene and an optional comonomer to obtain a suspension comprising the ethylene-based polymer and wax in a suspension medium comprising a diluent,
  b) separating the ethylene-based polymer from the suspension to obtain a liquid stream comprising the diluent and the wax,
  c) feeding at least part of the liquid stream to a forced circulation reboiler for separating the diluent and the wax to obtain an evaporated stream comprising the diluent, wherein the evaporated stream is recycled to step a).

2. The process according to claim 1, wherein the ethylene-based polymer is selected from an ethylene homopolymer or an ethylene copolymer of ethylene and C3-C12 α-olefin.

3. The process according to claim 1, wherein the suspension polymerizing in step a) is carried out at pressures of 0.1 to 20 MPa and temperatures of 40° C. to 130° C.

4. The process according to claim 1, wherein step a) is performed in in a series of polymerization reactors comprising at least a first polymerization reactor and a second polymerization reactor, wherein the suspension subjected to step b) is obtained in the second polymerization reactor.

5. The process according to claim 4, wherein step a) comprises
  a1) feeding ethylene, hydrogen and catalyst components and a first diluent into the first polymerization reactor to prepare a first suspension of solid particles of a first ethylene polymer in a first suspension medium,
  a2) feeding the first suspension into a flash drum for vaporizing a part of the first suspension medium to obtain a hydrogen-depleted suspension and
  a3) feeding the hydrogen-depleted suspension, ethylene and comonomer and a second diluent into the second polymerization reactor to prepare a second suspension of solid particles of a second ethylene polymer in a second suspension medium.

6. The process according to claim 5, wherein each of the first diluent and the second diluent comprises branched heptane.

7. The process according to claim 5, wherein the process comprises step d) of processing the evaporated stream obtained in step c) by a distillation column for providing the first diluent and at least part of the second diluent.

8. The process according to claim 4, wherein a further reactor is connected to upstream of the first polymerization reactor and/or downstream of the second polymerization reactor.

9. The process according to claim 5, wherein a pressure in the flash drum is lower than 0.1 MPa.

10. The process according to claim 5, wherein an amount of the comonomer in the second diluent is 1 to 10 wt % of the second diluent.

11. The ethylene-based polymer prepared according to the process according to claim 1, wherein the ethylene-based polymer is a copolymer of ethylene and 1-butene having a strain hardening value of at least 60 MPa according to ISO 18488:2015, wherein the ethylene-based polymer is a multimodal copolymer of ethylene and 1-butene and has a density of at least 940 kg/m³ and a melt flow index of 0.25 to 10 dg/min as determined by ISO1133-1:2011 at 190° C. and a load of 5 kg.

12. An article comprising the ethylene-based polymer according to claim 11.

13. The article according to claim 12, wherein the article is a pipe.

* * * * *